United States Patent [19]

Narishima et al.

[11] Patent Number: 5,180,257
[45] Date of Patent: Jan. 19, 1993

[54] STRAIGHTENING INSTRUMENT AND CYCLONE

[75] Inventors: Ryousuke Narishima; Tetsuo Ogiri; Youji Kawamura; Hiroaki Iwakawa, all of Tokyo, Japan

[73] Assignee: Onoda Cement Co. Ltd., Onoda, Japan

[21] Appl. No.: 627,462

[22] Filed: Dec. 14, 1990

[30] Foreign Application Priority Data

Dec. 16, 1989 [JP] Japan .................. 1-326996
Mar. 19, 1990 [JP] Japan .................. 2-69055

[51] Int. Cl.⁵ .................................... B65G 53/60
[52] U.S. Cl. ........................... 406/173; 138/37; 138/39; 209/144; 209/154; 209/211
[58] Field of Search ............ 406/173, 92; 138/40, 138/42, 37, 39; 209/211, 144, 154; 210/512.1; 55/459.1

[56] References Cited

U.S. PATENT DOCUMENTS 2,222,930 11/1940 Arnold ..................... 209/211 X
4,422,342 12/1983 Smith et al. ................. 138/39 X

FOREIGN PATENT DOCUMENTS 183207 2/1955 Austria .................. 209/211
25958 7/1953 Finland ................. 55/459.1
1054540 2/1954 France ................. 209/144
2618858 2/1989 France ................. 138/37
149666 12/1977 Japan .

Primary Examiner—Margaret A. Focarino
Assistant Examiner—James M. Kannofsky
Attorney, Agent, or Firm—Armstrong, Nikaido, Marmelstein, Kubovcik & Murray

[57] ABSTRACT

A cyclone comprising a swirl cylinder, an inner tube disposed in the upper section of the swirl cylinder, an inlet duct arranged tangentially to the outer periphery of the swirl cylinder, a drop opening formed in the lower section of the swirl cylinder, and a straightening instrument disposed in a space directly below the inner tube. The straightening instrument includes a conical member coaxial with the inner tube and guide plates arranged along a conical surface at the outer periphery of the conical member. A lower section of each of the guide plates is curved to encounter the turn tangential velocity components of a circumferential spiral stream smoothly into axial velocities alone, and unnecessary vortices which are not required for separation of particles and which cause energy loss are eliminated.

7 Claims, 9 Drawing Sheets

F I G. 10
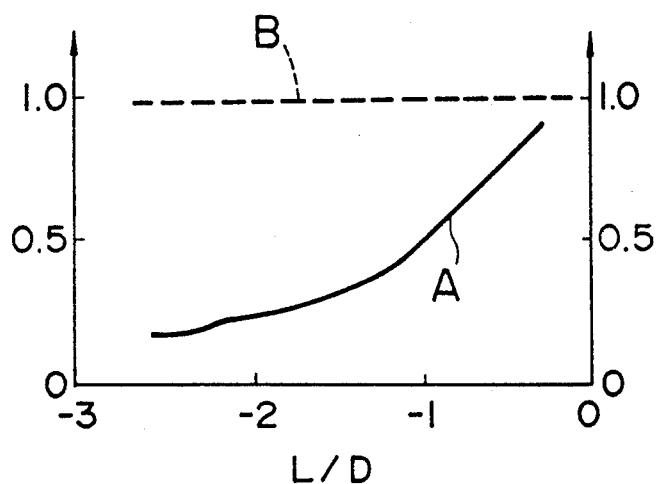
F I G. 11
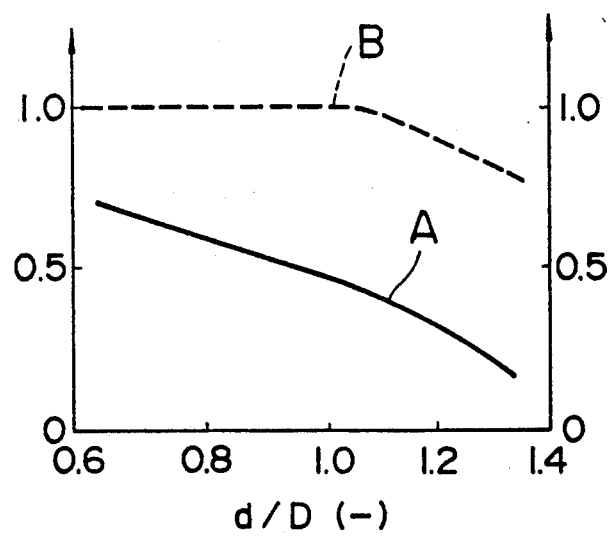

STRAIGHTENING INSTRUMENT AND CYCLONE

BACKGROUND OF THE INVENTION

The present invention relates to a cyclone which constitutes a part of a suspension preheater used as a preheating device for heating materials in a cement producing apparatus, and to other general cyclones, and also relates to a straightening instrument used in a fine particle discharge section of a swirl flow type classifier and to a cyclone using such a straightening instrument.

Heretofore, in a cyclone using the above-mentioned type straightening instrument, wherein a multiphase stream containing a powder or granule material and a fluid is introduced tangentially into a swirl cylinder through its upper opening, and then the powder or fine particle material is separated within the swirl cylinder while thus separated powder or fine particle material being lowered in the cylindrical casing so as to be discharge though its lower discharge opening, and wherein a fluid including in part a fine powder is discharged to a next process station through a fluid discharge inner tube which is attached to the center of the upper end section of the cylindrical casing and which is opened to the inside of the cylindrical casing, a plurality of rectifying vanes which are twisted blades having an arbitrary blade width that is smaller than one-half of the inner diameter of the above-mentioned fine particle discharge inner tube, are attached in one and the same inner peripheral surface of the inner tube at an arbitrary position so that it can be moved by a suitable drive means in the axial direction of the discharge cylinder, thereby the swirl stream in the inner peripheral direction is turned into an axial stream (Refer to Japanese Laid-Open Patent No. 52-149666).

The above-mentioned cyclone with rectifying vanes attached to the forward end of the inner tube can reduce a pressure loss relatively, in comparison with a cyclone having no such rectifying blades attached to the inner tube. However, a lowering of collecting efficiency is inevitable in this cyclone. On the contrary, should the collecting efficiency be maintained, a reduction in collecting efficiency is not always satisfactory (refer to Japanese Laid-Open Patent No. 52-149666).

One object of the present invention is to reduce the pressure loss in the above-mentioned conventional device by an extremely large degree without lowering the collecting efficiency thereof.

SUMMARY OF THE INVENTION

A first straightening instrument according to the present invention is characterized in that guide plates are provided to a conical surface at the periphery of an imaginary conical member so as to turn tangential velocity components owned by a swirl stream, into axial velocity components alone. Further, a second straightening instrument according to the present invention is characterized in that guide plates are provided on a conical surface at the periphery of a conical member so as to turn tangential velocity components owned by a spiral stream into axial velocity components alone. Further, a third straightening instrument according to the present invention is characterized in that a plurality of reversed triangular shape planar guide plates each having a curved surface formed in at least the lower half section thereof are arranged around the center axis of the above-mentioned conical straightening instrument at equal angular intervals in directions in which the curved surfaces of the planar guide plates encounter a swirl stream running around the outer periphery of the conical member.

Further, a first cyclone according to the present invention, wherein an inner tube is disposed in the upper section of the inside of a swirl cylinder while an inlet duct is arranged tangentially to the outer periphery of the outer cylinder, and a drop opening is formed in the lower section of the swirl cylinder, is characterized in that a plurality of longitudinal planar guide plates each having a curved surface formed in at least the lower half section thereof are arranged around the center axis right below the inner tube at equal angular intervals, within a space just below the inner tube, in directions in which the curved surfaces of the planar guide plates encounter a swirl stream running along the inner peripheral surface of the swirl cylinder.

Further, a second cyclone according to the present invention, wherein an inner tube is disposed in the upper section of the inside of a swirl cylinder while an inlet duct is arranged tangentially to the outer periphery of the swirl cylinder, and a discharge opening is formed in the lower section of the swirl cylinder, is characterized in that a conical member is disposed concentrically with the above-mentioned inner tube, a plurality of reversed triangular shape planar guide plates each having a curved surface in at least the lower half section thereof are arranged around the center axis of the above-mentioned conical member at equal angular intervals in directions in which the curved surfaces of the planar guide plates encounter a swirl stream running around the outer periphery of the conical member.

A multiphase stream consisting of a powder and granule material and a fluid is tangentially fed into the swirl cylinder from the inlet duct so as to induce a swirl stream within the swirl cylinder, which is then shifted from the upper section to the lower section of the swirl cylinder while particles suspending in the fluid are collected on the wall surface side of the swirl cylinder under centrifugal force, and accordingly the particles descend spirally and are then discharged to the outside from the lower section of the conical section. Further, a part of a fine powder is shifted to a position just below the inner tube while establishing the swirl stream together with the above-mentioned carrier fluid and the like, and is then guided by the curved planar guide plates located at that position so as to be turned from the swirl stream into an upward stream. In this phase, tangential velocity components owned by the swirl stream are turned into axial velocities alone, and then it is shifted into the next process station through the inner tube. In the above-mentioned steps, the conical member disposed in the space below the inner tube restrains an updraft ascending from a part below the conical member so as to reduce fluid flowing into the space, and to restrain the fluid resistance, as far as possible, which is unnecessary to separate particles in this part. Further, a substantial part of the fluid flowing through the cyclone is rectified into an axial stream by the straightening instrument in the space just below the inner tube, that is, the space between the guide plates and is then discharged smoothly to the outside of the cyclone system, thereby it is possible to obtain the above-mentioned effects.

BRIEF DESCRIPTION OF THE DRAWINGS

FIGS. 1 to 11 are views illustrating one embodiment of the present invention, among which FIG. 1 is a transverse sectional view illustrating a cyclone according to the present invention;

FIG. 2 is a plan view thereof;

FIG. 3 is an enlarged perspective view illustrating an essential part shown in FIG. 1;

FIG. 4 is a front view illustrating the part shown in FIG. 3;

FIG. 5 is a plan view thereof;

FIG. 6 is a sectional view along line VI—VI in FIG. 4;

FIG. 7 is a sectional view along line VII—VII in FIG. 4;

FIG. 8 is a chart showing a relationship between the tangential air velocity and the distance from the outer wall to the center of the cyclone;

FIG. 9 is an enlarged view illustrating an essential part shown in FIG. 1;

and FIGS. 10 and 11 are charts relating to the pressure loss and the collecting efficiency ratio.

Further, FIGS. 12 to 17 are views illustrating an embodiment of the present invention different from the above-mentioned embodiment, among which FIG. 12 is a transverse sectional view of another cyclone according to the present invention;

FIG. 13 is a plan view thereof;

FIG. 14 is an enlarged sectional view illustrating a straightening instrument;

FIG. 15 is an enlarged sectional view illustrating another embodiment of the straightening instrument, corresponding to FIG. 14;

DESCRIPTION OF THE PREFERRED EMBODIMENTS

Figure 1:
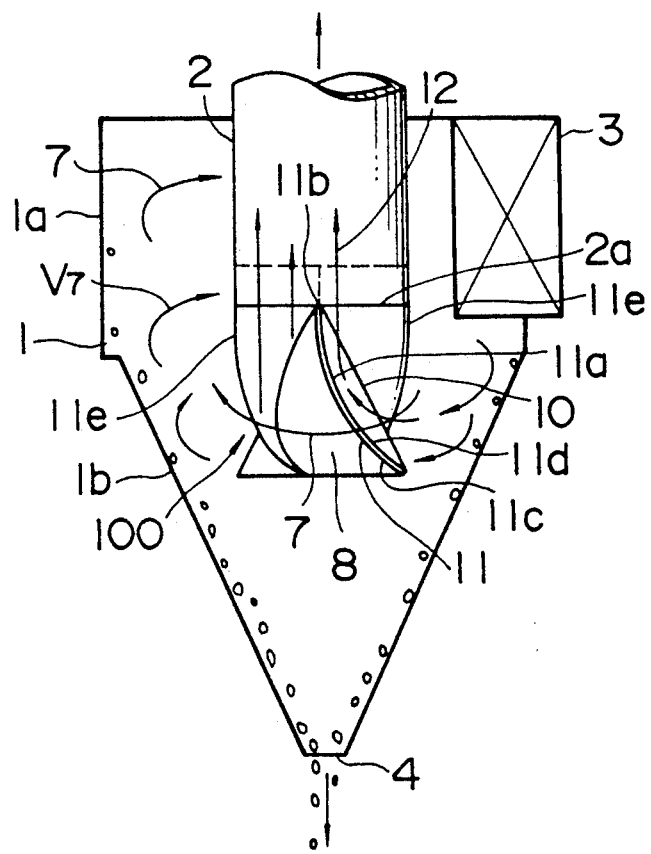
Figure 2:
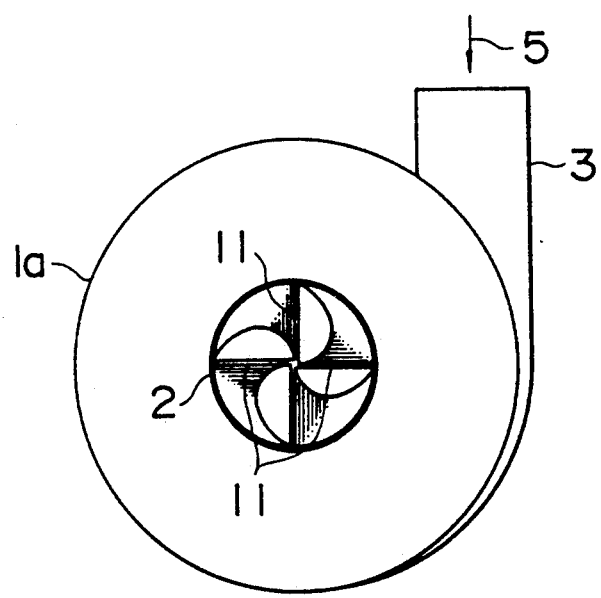
Figure 3:
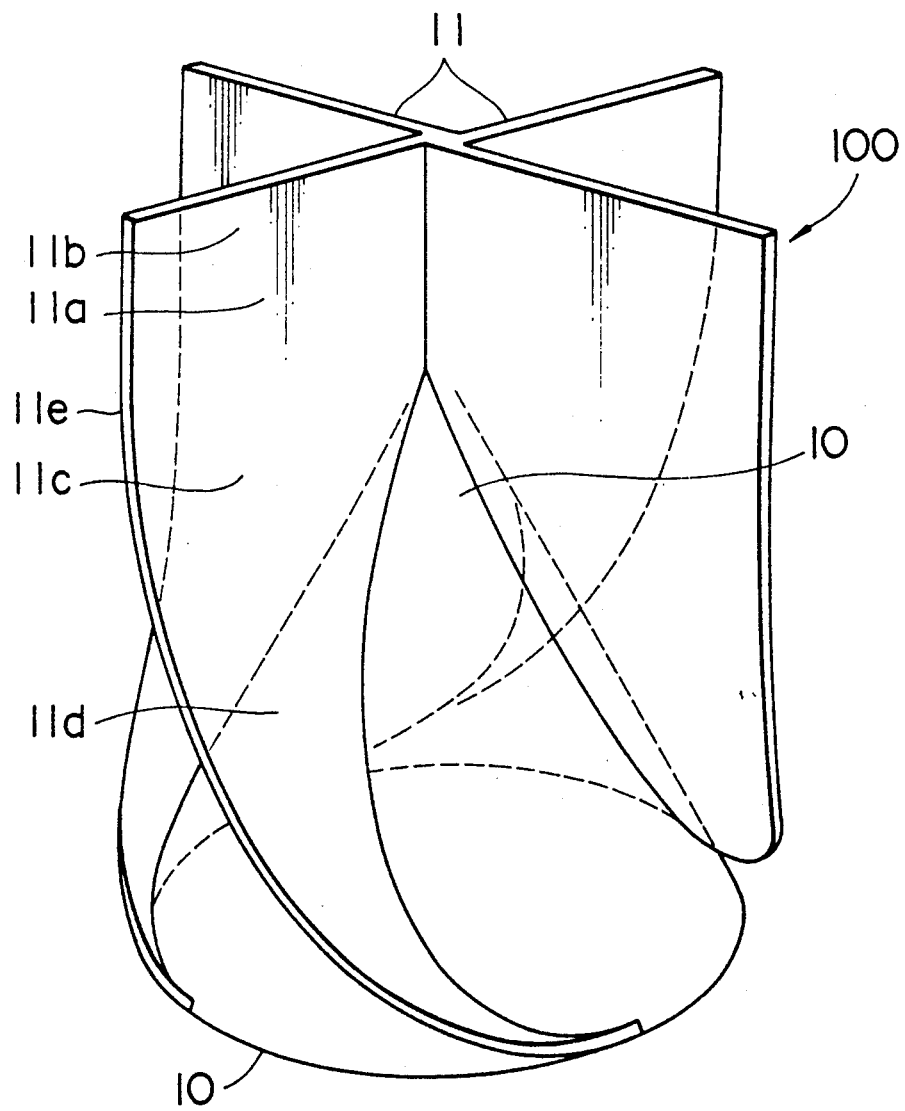
Figure 4:
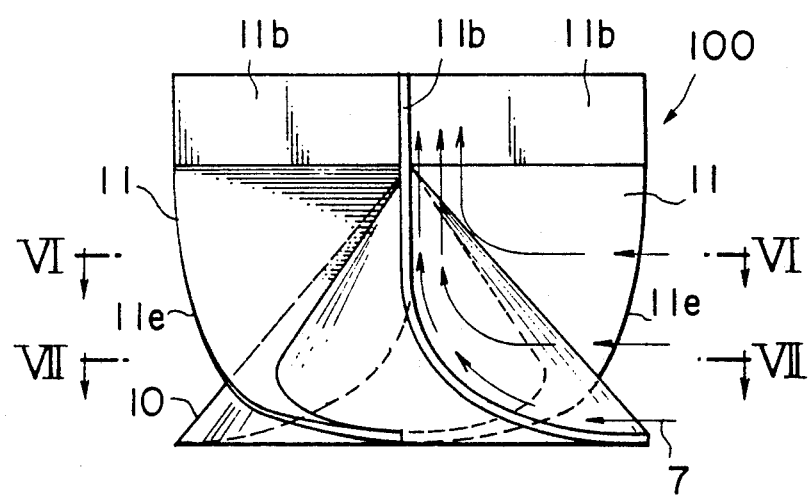
Figure 5:
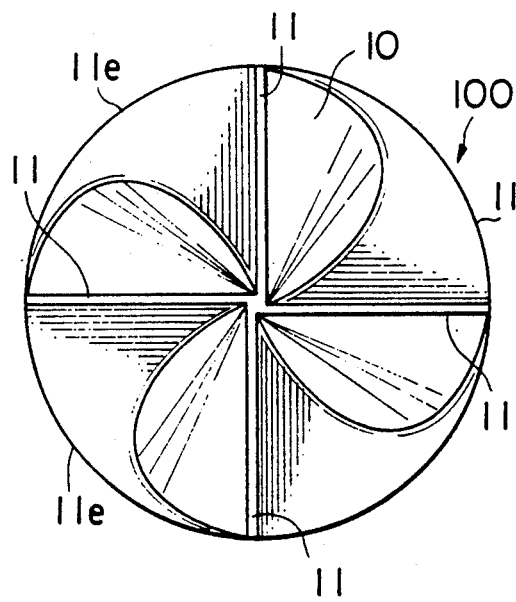
Figure 6:
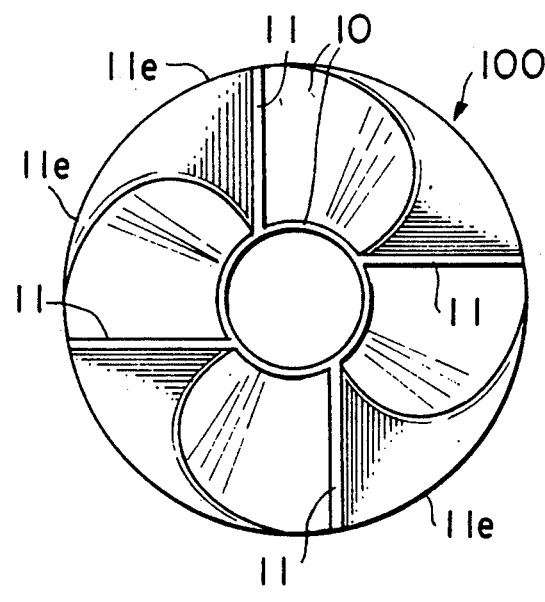
Figure 7:
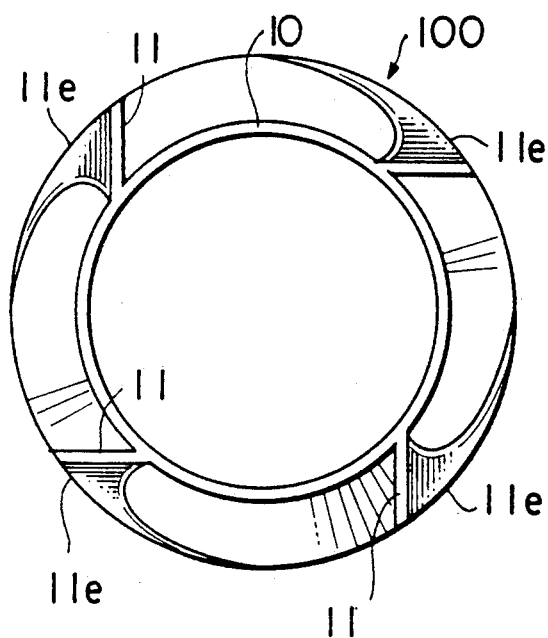

Explanation will be made of a first embodiment of the present invention with reference to FIGS. 1 to 7. An inner tube is concentrically disposed in the upper section of the inside of a swirl cylinder 1 composed of a cylindrical section 1a and an inverted conical cylindrical section 1b connected to the lower section of the former, and an inlet duct 3 is arranged tangentially to the outer periphery of the swirl cylinder 1. Further, the swirl cylinder 1 is formed in its lower section with a drop opening 4 for powder and granule materials. In this arrangement, a multiphase stream 5 consisting of a powder and granule material and carrier air is fed into the swirl cylinder 1, tangentially thereto from the inlet duct 3 so as to induce a swirl stream 7 in the swirl cylinder 1. The swirl stream 7 is shifted from the upper section to the lower section of the swirl cylinder 1 while particles suspending in the gas are ejected to the wall surface side of the swirl cylinder 1 under centrifugal force, then dropping along the inner wall surface thereof, and are finally discharged through the drop opening 4.

Figure 8:
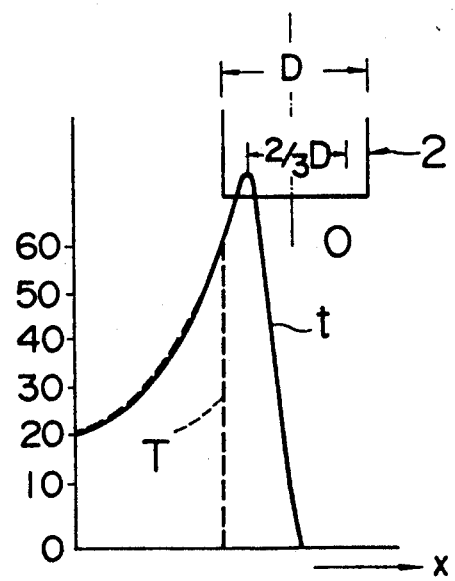

Further, a straightening instrument 100 composed of a conical member 10 and planar guide plates 11 are disposed in a space 8 directly below the lower end section 2a of the inner tube 2, concentrically with the above-mentioned inner tube 2. A plurality, preferably four to six, of the planar plates 11, are arranged at the outer peripheral surface of the conical member 10 in directions in which their faces 11d encounter the spiral stream 7 while their longitudinal directions being extending vertically. Further, the upper sections 11b of the planar guide plates 11 are fixed to the lower end section 2a of the above-mentioned inner tube 2. Each of the planar guide plates is smoothly curved toward the upstream side of the swirl stream in a part 11c other than the upper section 11b thereof so as to form a curved surface 11d. The outer peripheral edges 11e of the thus formed plurality of the planar guide plates 11 are located at positions inward from the inner tube 2. A powder or the like having a grain size smaller than that of the powder and granule material separated by the swirl stream 7 near to the inner wall surface of the above-mentioned swirl cylinder 1 creates the swirl stream 7 together with the above-mentioned carrier air and the like, being shifted into the space 8 directly below the inner tube, and is guided by the surfaces 11a of the curved planar guide plates 11 located in the space 8 so as to be turned gradually from the swirl stream 7 into an upward stream 12. In this phase, tangential velocity components $V_7$ owned by the swirl stream 7, turned into axial velocities alone, and in this condition, it is shifted to the next process station through the inner tube 2. At this time, the stream in the cyclone 15 is given by the chain line T shown in FIG. 8. A position where the tangential air velocity $V\theta$ (m/sec) becomes the highest exists under the outer diameter section or the outer wall of the inner tube. Although the air velocity $V\theta$ in an area which contributes the separating action for particles does not vary, the air velocity $V\theta$ becomes nearly zero in the inside of the inner tube which does not contribute the separating action.

Namely, any unnecessary vortex which is not required for separation of particles and which produces energy loss is eliminated. The above-mentioned effect can be obtained in such a manner that an updraft from a part below the conical member disposed in the space below the inner tube is restrained by the conical member so as to reduce a fluid which flows thereinto, restraining the fluid resistance, as far as possible, which is unnecessary for separation of particles in this section, while rectifying a substantial part of the fluid flowing through the cyclone, into an axial stream by use of the straightening instrument in the space directly below the lower end part of the inner tube or the space between the guide plates and then discharging the fluid to the outside of the cyclone. Incidentally, the solid line t shown in FIG. 8 indicates the case where no straightening instrument 100 is provided, which is zero only at the center o of the cyclone. That is, in this case, unnecessary vortex which is not required for separation of particles and which produces energy loss exist in the cylinder.

Further, a space S through which an air stream A runs is gradually widened from the lower surface 10a to the top part 10b of the rectifier 10, and accordingly, flow rates of the air stream A per unit area are substantially equal to each other over the entire range of the space S. Accordingly, the energy loss can be made to be small, and the carrier air can be discharged uniformly.

Although the first embodiment of the present invention has been hereinabove explained with reference to the drawings, the present invention should not limited to the above-mentioned embodiment, but it can be realized by changing a part of the arrangement or adding, in part, another arrangement within the scope of the gist of the invention. For example, it has been explained in the above-mentioned embodiment that the straightening instrument 100 composed of the conical member 10 and the planar guide plates 11 is disposed in the space 5 directly below the inner tube 2, but it is possible to eliminate the conical member 10, that is, it is possible to constitute the straightening instrument 100 only by the planar guide plates.

Further, the straightening instrument 100 can be used not only for a cyclone but also for the fine discharge section of a forced vortex type pneumatic classifier.

In the present invention, as mentioned above, with the provision of the straightening instrument including the conical member and a plurality of reversed triangular shape planar guide plates having each a curved surface formed in at least the lower half section thereof and provided to the conical surface at the periphery of the conical member at equal angular intervals around the center axis in directions in which the curved surfaces of the planar guide plates encounter a swirl stream running around the outer periphery of the conical member, in the space directly below the lower end of the inner tube, the planar guide plates does not affect the swirl stream necessary for separation of particles outside of the inner tube, thereby it is possible to prevent the swirl from lowering the collecting efficiency thereof. Further, when the carrier air after being separated from the powder and granule material is then shifted into the space directly below the inner tube while creating a swirl stream, it is guided by the curved surfaces of the planar guide plates disposed in the space so as to be changed into an upward stream from the swirl stream. In this phase, tangential velocity components are converted into axial velocities, and in this condition, the carrier air flows through the inner tube. Accordingly, the swirl stream having its diameter smaller than the diameter of the inner tube ascends in the space directly below the inner tube as in the case of a cylone where nothing is provided in the space directly below the inner tube, and accordingly, there is raised no useless fluid resistance due to a swirl stream irreverent to the trapping down to the lower end of the inner tube. Accordingly, since the velocity of a swirl stream necessary for trapping outside of the inner tube is not decreased, no lowering of the collecting efficiency occurs.

Thus, according to the present invention, as being clear from the following experiment, the pressure loss can be reduced by a value more than 50% without lowering the collecting efficiency.

Figure 9:
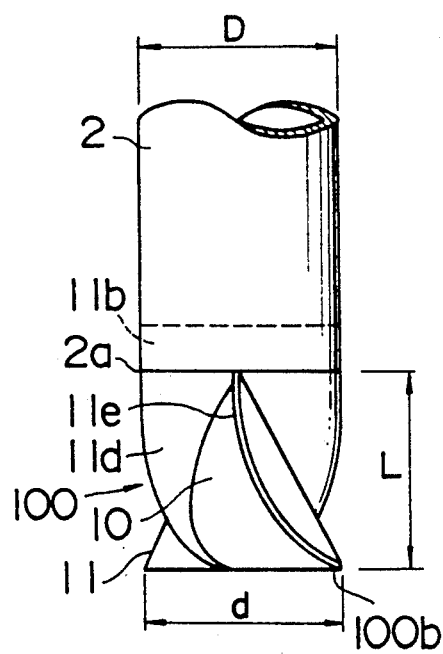

By setting a ratio d/D to 0.8 and while changing a ratio L/D, where D is the diameter of the inner tube, L is the distance between the lower end 2a of the inner tube and the lower end 100b of the straightening instrument 100, and d is the diameter of the lower end part of the straightening instrument 100 (refer to FIG. 9), the pressure loss P and the collecting efficiency $\eta$ were measured so as to know variations thereof, the result of the measurement is shown in FIG. 10. In this figure, the abscissa gives the above-mentioned ratio L/D (negative), and the left side ordinate gives the pressure loss ratio $A = P/P_0$ while the right side ordinate giving the trapping coefficient ratio $B = \eta/\eta_0$, these ratios being obtained in comparison with the corresponding values $P_0$, $\eta_0$ in the case where no straightening instrument is provided. It is clear from this figure, that the trapping coefficient $B = \eta/\eta_0$ which is 1.0 does not vary even though L/D is changed, and further, the longer the above-mentioned distance L, or the larger the negative value of L/D, the lower the pressure loss ratio A becomes.

Such a range that the above-mentioned ratio L/D is greater than ¼ and the lower end part 100b of the straightening instrument does not make contact with the reversed conical cylindrical section 1b, is preferable.

Further, by setting the above-mentioned ratio L/D to 1.0 while changing the ratio d/D between the diameter d of the lower end part of the straightening instrument 100 and the diameter D of the inner tube, the pressure loss ratio A and the collecting efficiency ratio B were measured so as to know the variations thereof, and the result of the measurement is shown in FIG. 11. In this figure, the abscissa gives the above-mentioned ratio d/D (negative), and the left side ordinate gives the pressure loss ratio A while the right side ordinate giving the collecting efficiency ratio B. It is clear from this figure, that the collecting efficiency ratio B decreases if the above-mentioned ratio d/D exceeds 1.0, and further, the larger the above-mentioned ratio d/D, the lower the pressure loss ratio A becomes. That is, it is preferable that the diameter d of the lower end of the above-mentioned straightening instrument 100 is equal to or slightly smaller than the diameter D of the inner tube.

Figure 12:
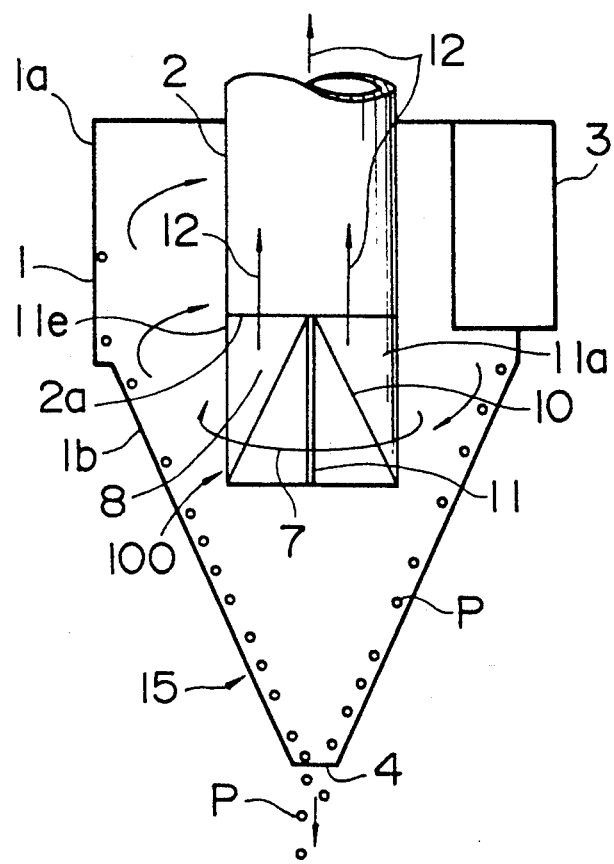
Figure 13:
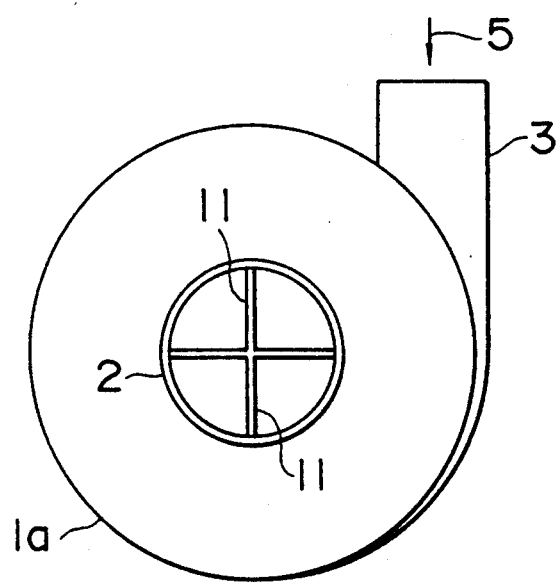
Figure 14:
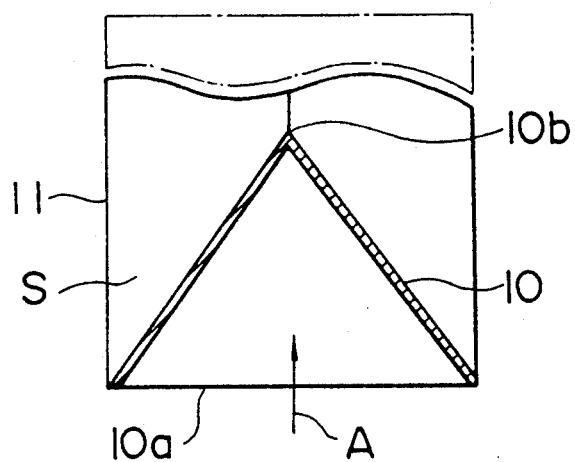

Next, explanation will be made of a second embodiment of the present invention which is a variant form of the invention as mentioned above, with reference to FIGS. 12 to 14. An inner tube 2 is coaxially disposed in the upper section of the inside of a swirl cylinder 1 consisting of a cylindrical section 1a and a reversed conical cylindrical section 1b connected to the lower part of the cylindrical section 1a, and the inlet duct 3 is arranged tangentially to the outer periphery of the swirl cylinder 1. Further, the swirl cylinder 1 is formed its lower part with a drop opening 4 for powder and granule materials. In this arrangement, a multiphase stream 5 consisting of a powder and granule material and carrier air is fed into the swirl cylinder 1 from the inlet duct 3, tangentially so as to induce a swirl stream 7 in the swirl cylinder 1, which is shifted from the upper section to the lower section of the swirl cylinder 1 while particles suspending in the gas are collected on the wall surface side of the swirl cylinder under centrifugal force, these particles falling along the inner wall surface and being the discharged to the outside through the drop hole 4. Further, a straightening instrument 100 composed of a conical member 10 and planar guide plates 11 is disposed in a space 8 directly below the lower end 2a of the inner tube 2. That is, the conical member 10 is disposed in the space 8, concentrically with the inner tube 8, and a plurality, preferably 4 to 6, of planar guide plates 11 are arranged at the outer peripheral surface of the conical member 10. The rectifier 10, as shown in FIG. 14, is opened at its lower surface 10a while being closed at its top 10, and accordingly, an air stream A (carrier air stream or the like) cannot run through the inside of the rectifier 10. Further, each of the guide plates 11 is a triangular shape plate which is perpendicular to the center axis. The outer peripheral edges 11e of the plurality of the thus formed planar guide plates 11 are positioned inside of the inner tube 2. A powder and granule material which is not yet separated by the swirl stream 7 near to the inner wall surface of the above-mentioned swirl cylinder 1 is shifted into the space 8 directly below the inner tube 2 while creating the swirl stream 7 together with the above-mentioned carrier air, and is then guided by the curved surfaces 11a of the planar guide plates 11 disposed in the space 8 so as to be gradually turned into an upward stream 12 from the swirl stream 7. In this phase, swirling velocities owned by the swirl stream 7 are converted into axial velocities alone, and in this condition, it is shifted into the next process station by way of the inner tube 2.

Figure 15:
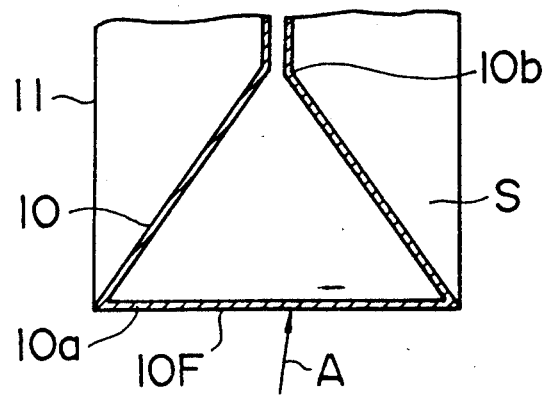
Figure 16A:
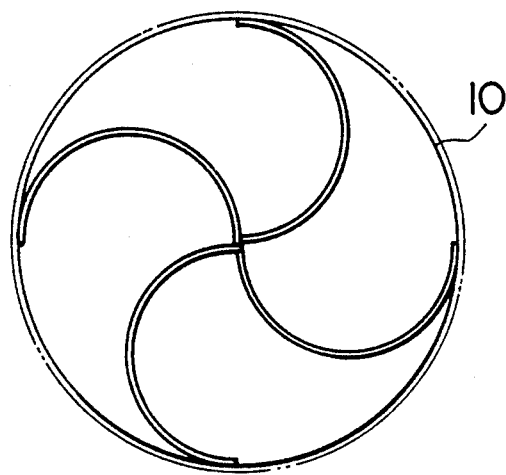
FIGS. 16A and 17A are plan views illustrating other embodiments of the straightening instrument, respectively.
Figure 16B:
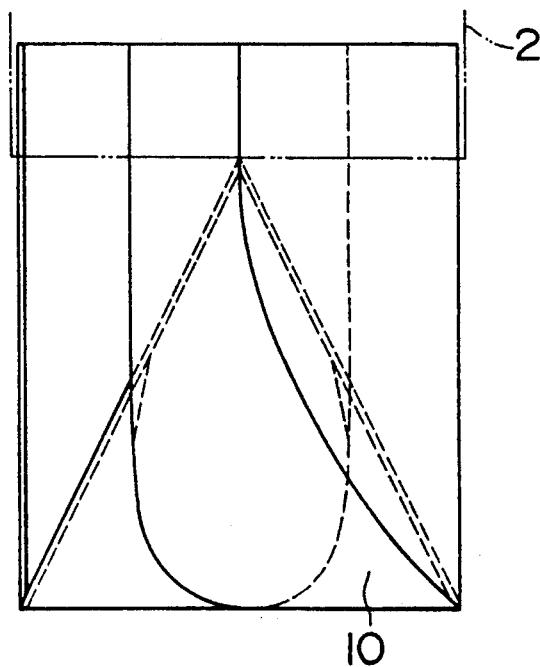
FIGS. 16B and 17b are front views thereof, respectively.
Figure 17A:
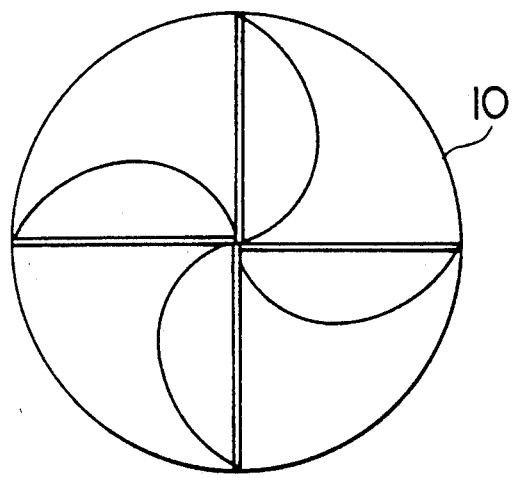
Figure 17B:
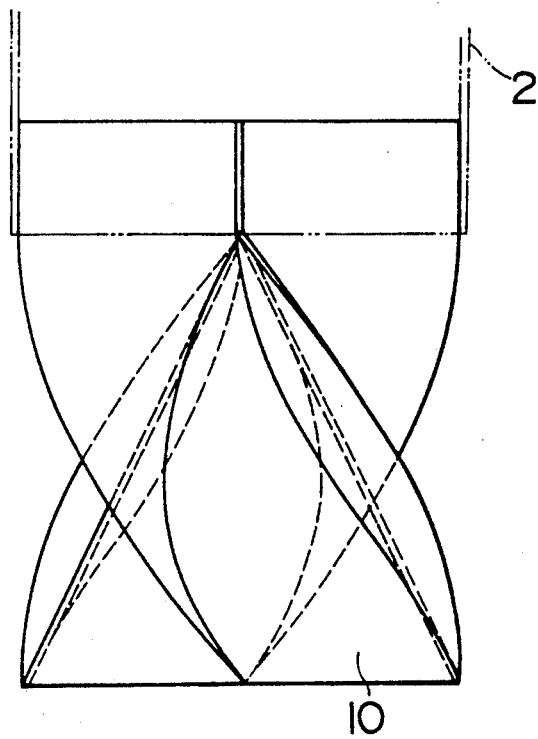

Although the embodiments of the present invention have been explained, the present invention should not be limited to these embodiments, and accordingly, the arrangement of the present invention can be realized by being partly changed, or by being in part added thereto with another arrangement. For example, instead of closing the elongated section 10b of the conical member 10 while opening the lower surface 10a, the top part 10b thereof may be opened, as shown in FIG. 15 while the lower surface 10a being closed so as to block the air stream A from flowing through the inside of the rectifier 10.

Further, the guide plates 11 may be twisted as shown in FIGS. 16A, 16B, 17A and 17B.

It is noted that the straightening instrument 100 can be disposed not only in a cyclone but also in a fine particle discharge section of a forced vortex flow type pneumatic classifier.

What is claimed is:

1. A straightening instrument comprising:
   a conical member having a center axis and a periphery at which a conical surface is formed;
   a plurality of reversed triangular shaped guide plates each having at least a lower half section formed as a curved surface and linear in shape when viewed in horizontal cross-section, said guide plates being arranged around said center axis of said conical member at equal angular intervals in directions in which the curved surfaces of said shaped guide plates extend downward to encounter a fluid stream swirling around the outer periphery of said conical member and direct the movement of said stream upward.

2. A straightening instrument as set forth in claim 1, wherein said plurality of planar guide plates are four to six in number.

3. A straightening instrument as defined by claim 1, wherein each of said shaped guide plates include an upper section formed as a planar surface and said curved lower section surface is formed to blend into said planar surface.

4. A cyclone comprising:
   a swirl cylinder having a center axis, inner and outer peripheries, and upper and lower sections;
   an inner tube disposed in the upper section of said swirl cylinder;
   an inlet duct arranged tangentially to the outer periphery of said swirl cylinder;
   a drop opening formed in the lower section of said swirl cylinder;
   a conical member arranged coaxially with said inner cylinder and having a center axis and an outer peripheral surface formed therein with a conical surface; and
   a plurality of reversed triangular shaped rectifying plates each having at least a lower half section formed as a curved surface and linear in shape when viewed in horizontal crosssection, said rectifying plates being arranged around said axis of said conical member at equal angular intervals in directions in which said curved surfaces of said shaped rectifying plates extend downward to encounter a fluid stream swirling around the outer periphery of said conical member and direct the movement of said stream upward.

5. A cyclone as set forth in claim 4, wherein a ratio of a vertical distance L from a lower end of said inner tube to a lower end of said conical member and a diameter D of said inner tube is at least 1:4.

6. A cyclone as set forth in claim 4, wherein a diameter d of a lower end of said shaped rectifying plates is equal to or slightly smaller than a diameter D of said inner tube.

7. A cyclone as defined by claim 4, wherein each of said shaped rectifying plates include an upper section formed as a planar surface and said curved lower section surface is formed to blend into said planar surface.

* * * * *